United States Patent
Jung et al.

(10) Patent No.: US 12,288,870 B2
(45) Date of Patent: Apr. 29, 2025

(54) METHOD OF MANUFACTURING POSITIVE ELECTRODE MIXTURE FOR ALL-SOLID-STATE BATTERIES AND POSITIVE ELECTRODE MIXTURE FOR ALL-SOLID-STATE BATTERIES MANUFACTURED USING THE SAME

(71) Applicant: LG Energy Solution, Ltd., Seoul (KR)

(72) Inventors: Hye Ri Jung, Daejeon (KR); Hyea Eun Han, Daejeon (KR); Hoe Jin Hah, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 569 days.

(21) Appl. No.: 17/420,238

(22) PCT Filed: Sep. 7, 2020

(86) PCT No.: PCT/KR2020/012042
§ 371 (c)(1),
(2) Date: Feb. 14, 2022

(87) PCT Pub. No.: WO2021/049832
PCT Pub. Date: Mar. 18, 2021

(65) Prior Publication Data
US 2022/0181605 A1    Jun. 9, 2022

(30) Foreign Application Priority Data
Sep. 10, 2019   (KR) .................. 10-2019-0112262

(51) Int. Cl.
| | |
|---|---|
| H01M 4/36 | (2006.01) |
| H01M 4/04 | (2006.01) |
| H01M 10/0562 | (2010.01) |
| H01M 4/02 | (2006.01) |

(52) U.S. Cl.
CPC ......... *H01M 4/364* (2013.01); *H01M 4/0416* (2013.01); *H01M 10/0562* (2013.01); *H01M 2004/028* (2013.01)

(58) Field of Classification Search
CPC .............. H01M 4/364; H01M 4/0416; H01M 10/0562; H01M 2004/028; H01M 4/621; H01M 4/624; H01M 2300/0068; H01M 4/0404; H01M 4/139; H01M 4/62; H01M 10/052; H01M 4/04; H01M 4/13; H01M 10/0525; H01M 4/0471; Y02E 60/10
See application file for complete search history.

(56) References Cited

U.S. PATENT DOCUMENTS

| | | |
|---|---|---|
| 2014/0377627 A1 | 12/2014 | Furuya et al. |
| 2015/0270536 A1 | 9/2015 | Kawakami et al. |
| 2015/0325844 A1 | 11/2015 | Inoue |
| 2015/0372344 A1 | 12/2015 | Iwasaki et al. |
| 2016/0072120 A1 | 3/2016 | Mizutani |
| 2016/0190565 A1 | 6/2016 | Woo et al. |
| 2016/0268638 A1 | 9/2016 | Jang et al. |
| 2017/0244097 A1 | 8/2017 | Ose et al. |
| 2017/0309890 A1 | 10/2017 | Shin et al. |
| 2018/0309167 A1 | 10/2018 | Kaga et al. |
| 2019/0198870 A1 | 6/2019 | Watano et al. |

FOREIGN PATENT DOCUMENTS

| | | | |
|---|---|---|---|
| CN | 108475817 | A | 8/2018 |
| CN | 109643796 | A | 4/2019 |
| EP | 3576192 | A1 | 12/2019 |
| JP | 2013222501 | A | 10/2013 |
| JP | 2014-154407 | A | 8/2014 |
| JP | 2014143133 | A | 8/2014 |
| JP | 2016058277 | A | 4/2016 |
| JP | 2016189339 | A | 11/2016 |
| JP | 2017016766 | A * | 1/2017 |
| JP | 2017147158 | A | 8/2017 |
| JP | 2018005985 | A | 1/2018 |
| JP | 2018-120845 | A | 8/2018 |
| JP | 2018120710 | A | 8/2018 |
| JP | 2018120739 | A | 8/2018 |
| JP | 6409794 | B2 | 10/2018 |
| JP | 2019114398 | A | 7/2019 |
| KR | 20140094676 | A | 7/2014 |
| KR | 20160044951 | A | 4/2016 |
| KR | 20160109604 | A | 9/2016 |
| KR | 101673724 | B1 | 11/2016 |

(Continued)

OTHER PUBLICATIONS

Search Report dated Apr. 26, 2024 from Office Action for Chinese Application No. 202080031841 issued Apr. 29, 2024. 2 pgs.

(Continued)

*Primary Examiner* — Muhammad S Siddiquee
(74) *Attorney, Agent, or Firm* — Lerner David LLP

(57) ABSTRACT

Disclosed are a method of manufacturing a positive electrode mixture for all-solid-state batteries and a positive electrode mixture for all-solid-state batteries manufactured using the same, and more particularly a method of manufacturing a positive electrode mixture for all-solid-state batteries including mixing a positive electrode active material and a solid electrolyte with each other in a dry state, mixing the mixture with an additional solid electrolyte in a wet state, and adding a conductive agent and performing mixing in a wet state at the time of manufacturing the positive electrode mixture for all-solid-state batteries and a positive electrode mixture for all-solid-state batteries manufactured using the same.

18 Claims, 8 Drawing Sheets

(56) References Cited

FOREIGN PATENT DOCUMENTS

KR     101878339 B1    7/2018
KR    20180115130 A   10/2018

OTHER PUBLICATIONS

International Search Report for Application No. PCT/KR2020/012042, mailing dated Dec. 11, 2020, 2 pages.
Extended European Search Report including Written Opinion for Application No. 20863123.4 dated Mar. 9, 2022, pp. 1-8.
Nam et al., Toward practical all-solidstate lithium-ion batteries with high energy density and safety: Comparative study for electrodes fabricated by dry- and slur rymixing processes. Jounal of Power Sources, 2018, vol. 375, pp. 93-101 (Nov. 23, 2017.

* cited by examiner

[FIG. 1]
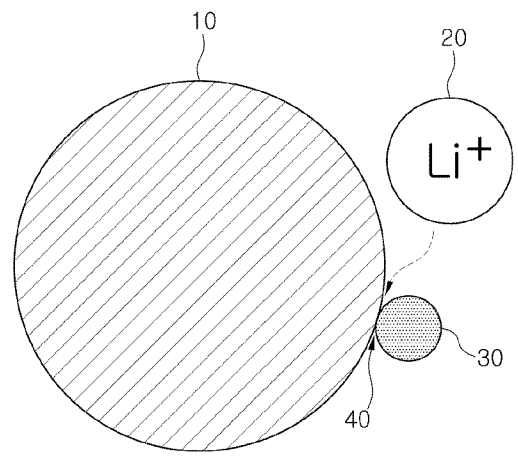
[FIG. 2]
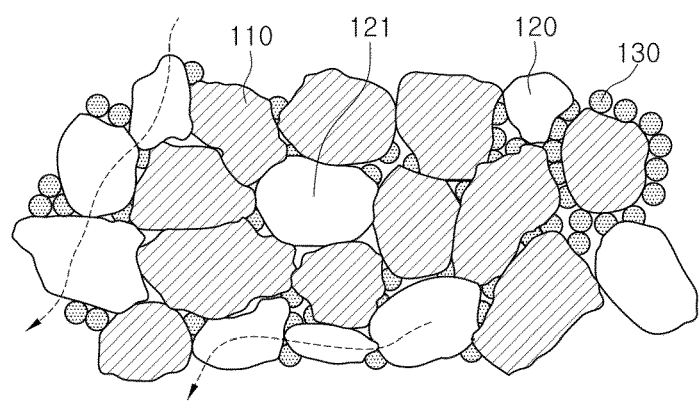

[FIG. 3]
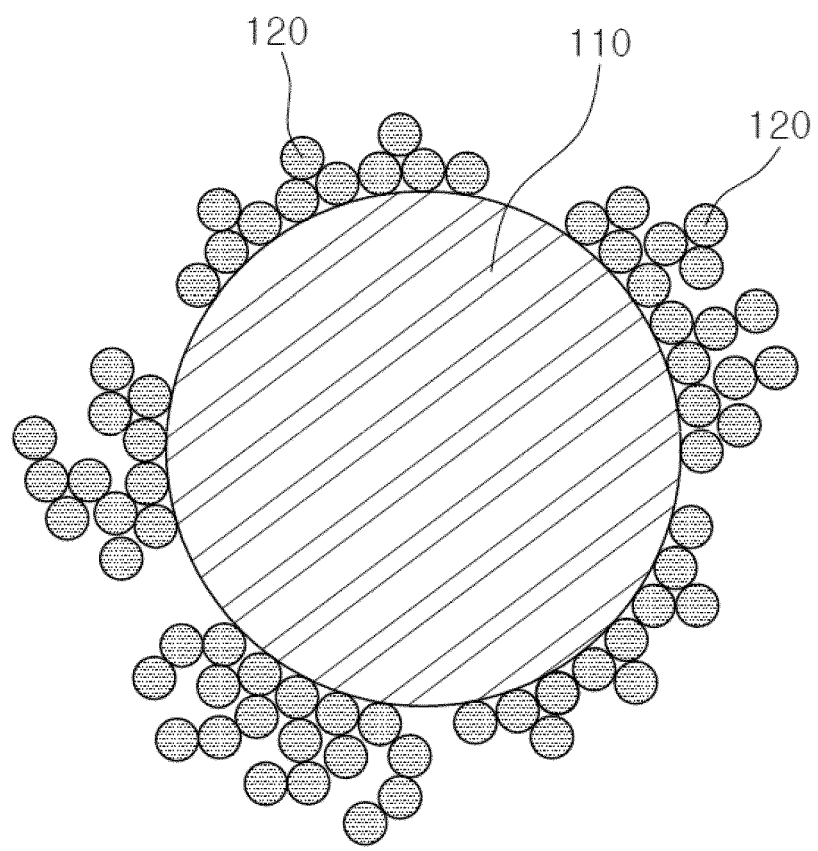

【FIG. 4】
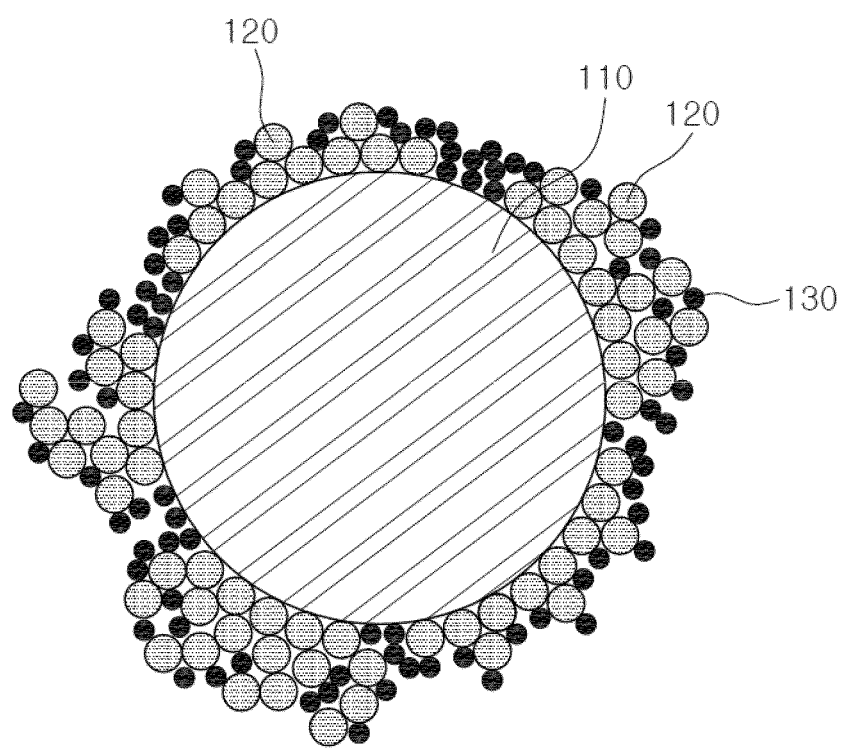

[FIG. 5]
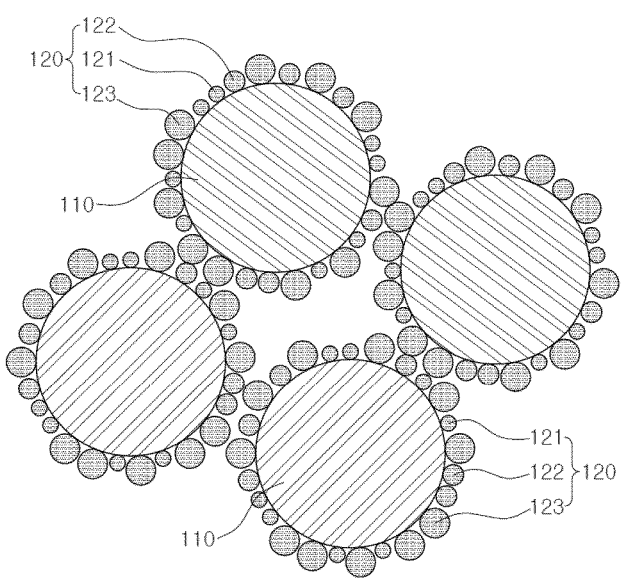

[FIG. 6]
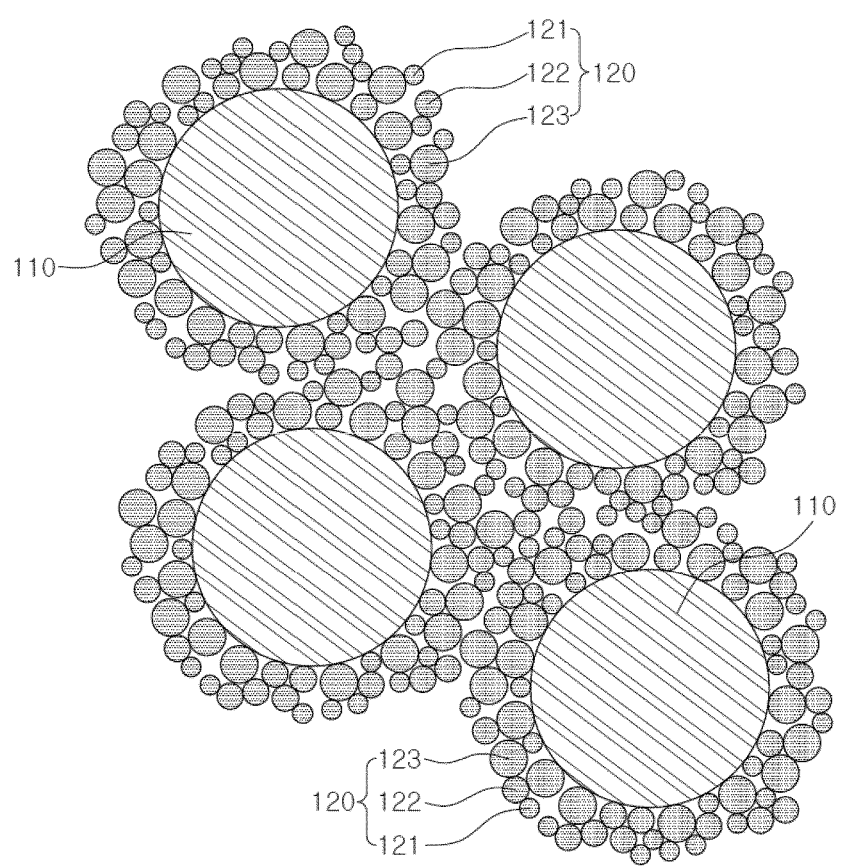

[FIG. 7]
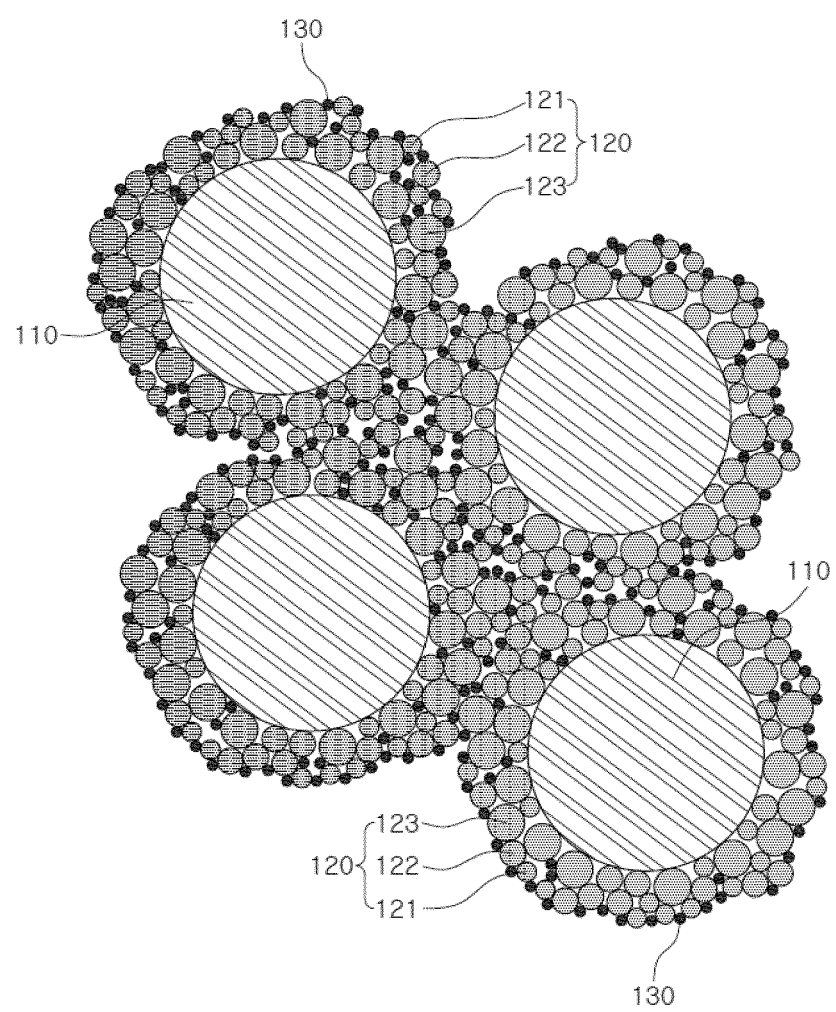

【FIG. 8】
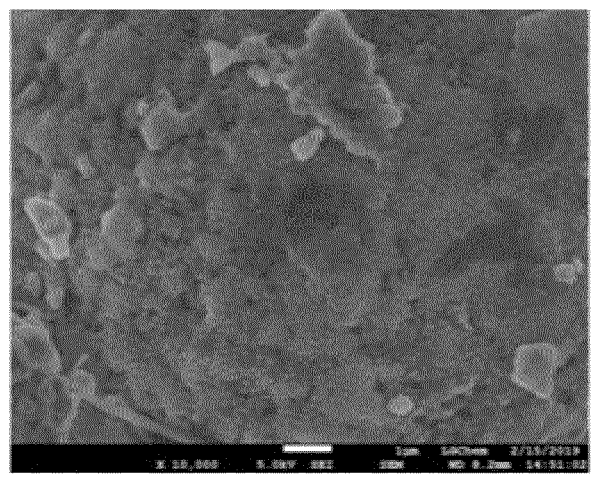
【FIG. 9】
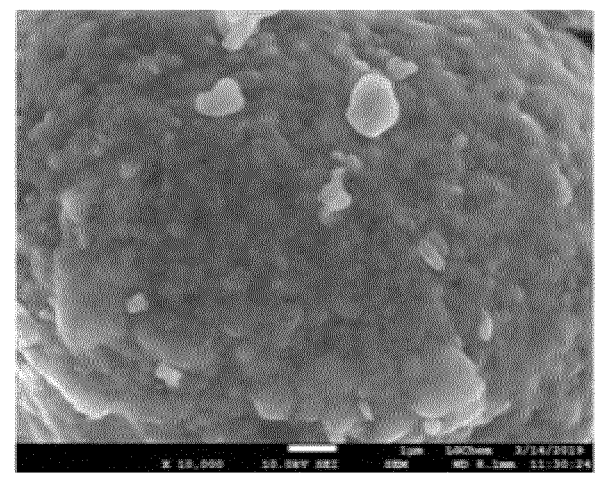

【FIG. 10】
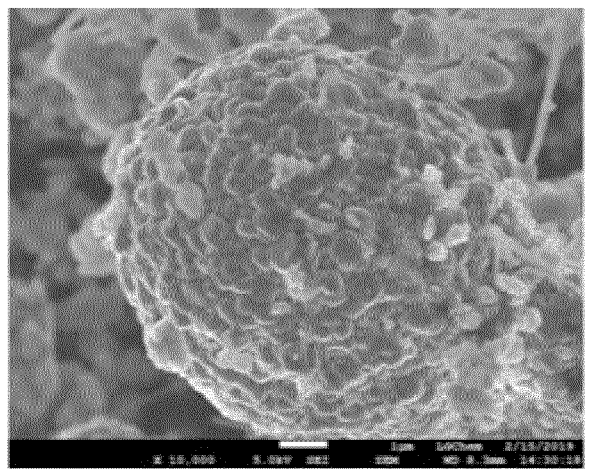
【FIG. 11】
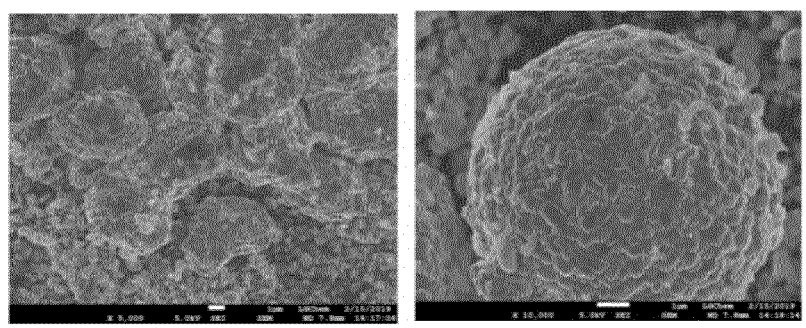

METHOD OF MANUFACTURING POSITIVE ELECTRODE MIXTURE FOR ALL-SOLID-STATE BATTERIES AND POSITIVE ELECTRODE MIXTURE FOR ALL-SOLID-STATE BATTERIES MANUFACTURED USING THE SAME

CROSS-REFERENCE TO RELATED APPLICATION(S)

This present application is a national phase entry under 35 U.S.C. § 371 of International Application No. PCT/KR2020/012042 filed Sep. 7, 2020, which claims priority from Korean Patent Application No. 10-2019-0112262 filed Sep. 10, 2019, all of which are incorporated herein by reference in their entirety.

TECHNICAL FIELD

The present invention relates to a method of manufacturing a positive electrode mixture for all-solid-state batteries and a positive electrode mixture for all-solid-state batteries manufactured using the same. More particularly, the present invention relates to a method of manufacturing a positive electrode mixture for all-solid-state batteries including mixing a positive electrode active material and a solid electrolyte with each other in a dry state, mixing the mixture with an additional solid electrolyte in a wet state, and adding a conductive agent and performing mixing in a wet state at the time of manufacturing the positive electrode mixture for all-solid-state batteries and a positive electrode mixture for all-solid-state batteries manufactured using the same.

BACKGROUND ART

A lithium ion secondary battery, which has high energy density, a low self-discharge rate, and a long lifespan, is suitable for a high-capacity battery. The lithium ion secondary battery has a problem of low safety with respect to overheating. Therefore, research to solve this problem has been steadily conducted.

An all-solid-state battery has been suggested as a solution for solving the safety problem of the lithium ion secondary battery. The all-solid-state battery has an electrolyte layer including a solid electrolyte, unlike conventional batteries using a liquid electrolyte. The solid electrolyte of the all-solid-state battery may have a positive electrode layer including a solid electrolyte and a negative electrode layer including a solid electrolyte formed on opposite surfaces thereof. Each electrode of the all-solid-state battery may be bonded to a current collector.

Since the all-solid-state battery uses a solid electrolyte instead of a liquid electrolyte, there is no liquid evaporation due to temperature change or there is no liquid leakage due to external impact. As a result, the all-solid-state battery has an advantage in that the all-solid-state battery is safe from explosion and fire. Since the all-solid-state battery does not require parts configured to prevent liquid leakage and explosion, the weight and volume of the all-solid-state battery are reduced, compared to the conventional lithium ion battery.

Based on the raw material of the solid electrolyte, the all-solid-state battery is classified as an oxide-based all-solid-state battery, a polymer-based all-solid-state battery, or a sulfide-based all-solid-state battery. The sulfide-based all-solid-state battery has attracted considerable attention, since the sulfide-based all-solid-state battery has lithium ion conductivity ($10^{-2}$ S/cm) higher than the lithium ion conductivities of other batteries and high temperature stability.

A method of manufacturing a positive electrode and a negative electrode of the all-solid-state battery is similar to a method of manufacturing a positive electrode and a negative electrode of a conventional lithium ion battery. Specifically, an active material, a conductive agent, and a binder formed in the form of solid particles are mixed with a solvent at a predetermined ratio to manufacture a mixture slurry having low fluidity. Subsequently, the slurry is coated on a metal current collector as a thin film, and is then dried and pressed. The all-solid-state battery is different from the conventional lithium ion battery in that a solid electrolyte is further mixed in the slurry manufacturing step.

Formation of the interface between the solid electrolyte and the active material is more difficult than formation of the interface between the liquid electrolyte and the active material. Since a binder of an active material layer disturbs formation of the interface between the active material and the solid electrolyte, electrical resistance is greatly increased. As a result, output of the all-solid-state battery may be reduced. Even in the case in which a material that exhibits high ion conductivity is used as the solid electrolyte, crystallized solid electrolyte must be pulverized into microscopic particles in order to mix the slurry with the solid electrolyte. In addition, since the solid electrolyte is mixed with a solvent at the time of forming the slurry, a conductivity decrease problem occurs due to a physical restriction, rather than inherent properties of the material. As a result, the lithium ion conductivity ($10^{-5}$ S/cm) of a battery using a solid electrolyte is still lower than the lithium ion conductivity ($10^{-2}$ S/cm) of a battery using a liquid electrolyte.

It is estimated that low ion conductivity of the all-solid-state battery is due to no formation of a triple point in the electrode (see FIG. 1). FIG. 1 shows the state in which a triple point is formed in an electrode of an all-solid-state battery. A point that an electrode active material 10, a conductive agent 30, and a solid electrolyte including lithium ions 20 commonly abut is formed. This point is called a triple point 40. The triple point 40 is a point at which electrochemical reaction occurs in the electrode. In the case in which a larger number of triple points are formed in the electrode, electrochemical reaction occurs more and more.

In the case in which an electrode active material, a solid electrolyte, a conductive agent, and a binder are simultaneously mixed with each other to manufacture a slurry, an active material isolated by the conductive agent (a dead active material) is generated, or a solid electrolyte isolated by the active material (a dead solid electrolyte) is generated. In the case in which the dead solid electrolyte is generated, the active material and the solid electrolyte are unnecessarily wasted. In addition, movement paths of lithium ions are blocked, whereby an additional problem of low energy density occurs.

Movement paths of lithium ions in a conventional all-solid-state battery are shown in FIG. 2. An electrode of FIG. 2 is manufactured using a method of simultaneously mixing an electrode active material 110, solid electrolytes 120 and 121, and a conductive agent 130. The solid electrolyte 121 located at the central portion of the electrode is isolated by the active material, and therefore the solid electrolyte is not used as a delivery path (indicated by a dotted line) of lithium ions. The solid electrolyte 121 isolated while not forming a triple point becomes unnecessary solid electrolyte. Therefore, it is preferable to reduce the dead solid electrolyte and to increase the content of the solid electrolyte participating in actual electrochemical reaction.

A method of sequentially introducing and pressing powder components constituting a battery into a cylindrical mold to bond a current collector to a positive electrode and a negative electrode is known as a method of manufacturing the all-solid-state battery. In the above method, the positive electrode (layer) is not uniformly deposited on an electrolyte layer. In the above method, uniform current distribution is not achieved in the positive electrode, and deviation in current density occurs, whereby performance of the battery may be deteriorated.

In the method of manufacturing the all-solid-state battery, not only nonuniform deposition of the positive electrode but also nonuniform distribution of a composition in the positive electrode may come into question. Nonuniform distribution of the positive electrode composition causes local overheating of the electrode, degradation of the active material, and dendrite growth of lithium metal. As a result, a decrease in charge and discharge lifespan of the battery is accelerated.

At the time of manufacturing the all-solid-state battery, therefore, a contact interface between the active material, the solid electrolyte, and the conductive agent must be increased to secure the optimum ion conduction path. In addition, uniform distribution of an electrode mixture on the current collector and uniform and even distribution of materials in the electrode mixture are important problems to be solved.

Patent Document 1 discloses a positive electrode for all-solid-state lithium secondary batteries manufactured through a pulverizing process using a wet type machine before or at the time of mixing lithium sulfide with a conductive agent and an electrolyte. Patent Document 1 also discloses a method of mixing the lithium sulfide after being dried with a conductive agent through a pulverizing process using a dry type machine. This is provided to reduce the particle diameter of the lithium sulfide to thus increase contact area between the lithium sulfide and the conductive agent or the electrolyte.

In Patent Document 1, the lithium sulfide is pulverized using the wet type machine before dry mixing. As a result, the contact surface between the electrode active material and the solid electrolyte is nonuniformly formed, whereby efficiency and energy density of the battery may be reduced.

Patent Document 2 discloses a method of manufacturing a positive electrode for all-solid-state lithium batteries including a step of uniformly distributing a solid electrolyte in pores of a mesoporous conductive agent to manufacture a conductive agent-solid electrolyte nanocomposite and coating the surfaces of lithium compound particles with the conductive agent-solid electrolyte nanocomposite and a step of connecting the coated lithium compound particles to each other using a binder.

In Patent Document 2, the solid electrolyte is uniformly distributed in the pores of the mesoporous conductive agent to secure ion-electron movement paths, and the lithium compound is used as an active material to maintain a stable structure even at the time of swelling. Referring to FIG. 2 in Patent Document 2, the active material is surrounded by a compound of the mesoporous conductive agent and the solid electrolyte, whereby a sufficient number of ion-electron movement paths are secured. In the case in which the pores are nonuniformly formed in the mesoporous conductive agent, however, the electrolyte may be nonuniformly distributed, and therefore performance of the battery may be deteriorated.

Patent Document 3 discloses a method of mixing a positive electrode active material having appropriate oil absorption and a solid electrolyte having an appropriate average particle size with each other under a non-solvent condition and molding the mixture using pressure in order to secure contact between the positive electrode active material and the solid electrolyte, to inhibit cracking in a positive electrode active material layer due to expansion and contraction of the positive electrode active material at the time of charging and discharging, and to obtain an excellent capacity retention rate.

In Patent Document 3, the pressure molding method is used, whereby it is difficult to uniformly deposit the positive electrode active material layer. As a result, uniform current distribution is not achieved in a positive electrode, and deviation in current density occurs, whereby performance of a battery is deteriorated.

As described above, various attempts, such as addition of an additional material at the time of manufacturing the electrode and changing the manufacturing method, have been made in order to increase the capacity of the all-solid-state battery and to solve inherent problems of the all-solid-state battery. However, an economic solution capable of improving performance of a battery has not yet been suggested.

PRIOR ART DOCUMENTS

Japanese Patent Application Publication No. 2013-222501 (2013 Oct. 28 "Patent Document 1")

Korean Registered Patent Publication No. 1673724 (2016 Nov. 1 "Patent Document 2")

Japanese Patent Application Publication No. 2014-143133 (2014 Aug. 7 "Patent Document 3")

DISCLOSURE

Technical Problem

The present invention has been made in view of the above problems, and it is an object of the present invention to provide a novel manufacturing method capable of increasing the contact interface between a solid electrolyte, a positive electrode active material, and a conductive agent and uniformly distributing the respective materials in order to increase the capacity of an all-solid-state battery.

Technical Solution

In order to accomplish the above object, the present invention provides a method of manufacturing a positive electrode mixture for all-solid-state batteries, the method including a) mixing a positive electrode active material and a solid electrolyte with each other in a dry state, b) adding an additional solid electrolyte to the mixture of step a) and performing mixing in a wet state, and c) adding a conductive agent to the mixture of step b) and performing mixing in a wet state.

The solid electrolyte of step b) may be a solution in which a solid electrolyte and a binder are dispersed in advance (a solid electrolyte pre-dispersion solution), and the conductive agent of step c) may be a solution in which a conductive agent and a binder are dispersed in advance (a conductive agent pre-dispersion solution).

The method may further include b1) adding a binder and performing mixing in a wet state, step b1) being performed between step b) and step c).

Solid electrolyte particles of step a) and step b) may be identical to each other.

Alternatively, the solid electrolyte particles of step a) and step b) may not be identical to each other. The solid electrolyte particles may not be identical to each other in terms of one or all of chemical ingredient, particle size, and particle size distribution.

The amount of the solid electrolyte mixed in step a) may be less than the amount of the solid electrolyte with which the entire outermost surface of the positive electrode active material is coated as a monolayer.

In addition, the amount of the solid electrolyte mixed in step a) may be 10 to 60 wt % of a total amount of the solid electrolyte used at the time of manufacturing the positive electrode mixture, and the amount of the solid electrolyte mixed in step b) may be 40 to 90 wt % of the total amount of the solid electrolyte used at the time of manufacturing the positive electrode mixture.

The positive electrode active material may include any one selected from the group consisting of a layered-structure material, a spinel-structure material, and an olivine-structure material or a mixture thereof.

The solid electrolyte may include a sulfide-based solid electrolyte. The sulfide-based solid electrolyte may include any one of a crystalline sulfide-based solid electrolyte and an amorphous sulfide-based solid electrolyte or a mixture thereof.

The conductive agent may include any one of graphite, a carbon-based material, metallic powder, metallic fiber, needle-shaped or branch-shaped conductive whisker, a conductive metal oxide, and a conductive polymer, or a mixture thereof.

The weight ratio of the entire positive electrode active material:the entire solid electrolyte:the entire conductive agent:the binder used in the positive electrode for all-solid-state batteries may be 50 to 80:10 to 30:1 to 10:1 to 10.

In addition, the present invention provides a positive electrode mixture for all-solid-state batteries manufactured by the positive electrode mixture manufacturing method mentioned above.

In addition, the present invention provides a method of manufacturing a positive electrode for all-solid-state batteries, the method including (S1) preparing the positive electrode mixture for all-solid-state batteries manufactured using the positive electrode mixture manufacturing method mentioned above and (S2) coating and drying a current collector with the positive electrode mixture of step (S1). In addition, the present invention provides a positive electrode for all-solid-state batteries manufactured using the positive electrode manufacturing method.

In addition, the present invention provides an all-solid-state battery including the positive electrode for all-solid-state batteries.

In the present invention, one or more constructions that do not conflict with each other may be selected and combined from among the above constructions.

DESCRIPTION OF DRAWINGS

FIG. 1 is a schematic view illustrating the state in which a triple point is formed in an electrode of an all-solid-state battery.

FIG. 2 is a schematic view illustrating paths of lithium ions in an electrode of a conventional all-solid-state battery.

FIG. 3 is a schematic view of a molecular structure in the case in which a positive electrode active material and a solid electrolyte are mixed with each other in bulk in a wet state.

FIG. 4 is a schematic view of a molecular structure of an electrode mixture obtained by mixing a positive electrode active material and a solid electrolyte with each other in bulk in a wet state and mixing the mixture with a conductive agent.

FIG. 5 is a schematic view of a molecular structure in the case in which a positive electrode active material and a solid electrolyte are mixed with each other in part in a dry state in accordance with a manufacturing method of the present invention.

FIG. 6 is a schematic view of a molecular structure in the case in which a positive electrode active material and a solid electrolyte are mixed with each other in part in a dry state and an additional solid electrolyte, formed as a pre-dispersion solution, is added thereto in a wet state in accordance with the manufacturing method of the present invention.

FIG. 7 is a schematic view of a molecular structure in the case in which a positive electrode active material and a solid electrolyte are mixed with each other in part in a dry state, an additional solid electrolyte, formed as a pre-dispersion solution, is added thereto in a wet state, and a conductive agent is mixed therewith in the form of a pre-dispersion solution in accordance with the manufacturing method of the present invention.

FIG. 8 is a scanning electron microscope (SEM) photograph of a final positive electrode mixture obtained by mixing a positive electrode active material and a solid electrolyte with each other in a dry state, mixing the mixture with an additional solid electrolyte in a dry state, and mixing the mixture with a conductive agent.

FIG. 9 is a scanning electron microscope photograph of a positive electrode mixture manufactured in accordance with a manufacturing method of the present invention.

FIG. 10 is a scanning electron microscope (SEM) photograph of a final positive electrode mixture obtained by mixing a positive electrode active material and a solid electrolyte pre-dispersion solution with each other in a wet state, mixing the mixture with an additional solid electrolyte pre-dispersion solution in a wet state, and mixing the mixture with a conductive agent in a wet state.

FIG. 11 is a scanning electron microscope (SEM) photograph of molecules in the case in which a positive electrode active material and a solid electrolyte pre-dispersion solution are mixed with each other in a wet state.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

"Electrical resistance" mentioned throughout this specification should be understood as meaning "surface resistance" unless particularly mentioned otherwise.

A "positive electrode active material" mentioned throughout this specification means a compound that actually participates in positive electrode reaction, and a "positive electrode mixture" means a composition including a positive electrode active material, a conductive agent, and a solid electrolyte used to manufacture a positive electrode.

Hereinafter, the present invention will be described in more detail.

The present invention relates to a method of manufacturing a positive electrode mixture for all-solid-state batteries, which includes a) mixing a positive electrode active material and a solid electrolyte with each other in a dry state, b) adding an additional solid electrolyte to the mixture of step a) and performing mixing in a wet state, and c) adding a conductive agent to the mixture of step b) and performing mixing in a wet state.

The dry state is a state in which no solvent is added. The temperature in the dry state may be 20 to 40° C. At this time, the dew point may be −70 to −50° C. As long as the properties of the active material, the solid electrolyte, and the conductive agent are not changed, higher temperature and lower humidity are preferable. The moisture content of each particle in the dry state is not restricted. It is preferable that each particle be dried at 120° C. for 6 hours.

The wet state is a state in which a solvent is added. It is preferable that the solvent be a liquid at the processing temperature and be inert with respect to a sulfide-based electrolyte. Specifically, an aliphatic hydrocarbon-based solvent, such as pentane, normal hexane, octane, cyclopentane, or cyclohexane; aromatic hydrocarbon-based solvent, such as benzene, toluene, or xylene; an aldehyde-based solvent, such as furfural; a ketone-based solvent, such as acetone, methyl ethyl ketone, cyclopentanone, or cyclohexanone; an ester-based solvent, such as butyl acetate, ethyl acetate, methyl acetate, butyl propionate, ethylene glycol monoethyl ether acetate, propylene glycol monomethyl ether acetate, or 3-methoxybutyl acetate ethylene glycol diacetate; an ether-based solvent, such as tetrahydrofuran, dioxane, or ethylene glycol dimethyl ether; an alcohol-based solvent, such as methanol, ethanol, normal propyl alcohol, isopropyl alcohol, butyl alcohol, octyl alcohol, cyclohexanol, allyl alcohol, benzyl alcohol, cresol, or furfuryl alcohol; a polyol-based solvent, such as glycerol, ethylene glycol, or diethylene glycol; an alcohol ether-based solvent, such as ethylene glycol monomethyl ether, ethylene glycol monoethyl ether, ethylene glycol monobutyl ether propylene glycol monomethyl ether, or diethylene glycol monobutyl ether; an aprotic polar solvent, such as N-methyl-2-pyrrolidone, dimethyl sulfoxide, or dimethyl formamide; or a mixture of water and one or more thereof may be used as the solvent. Thereamong, a nonpolar solvent that does not react with a sulfide-based solid electrolyte while having high dispersion force may be used. Specifically, aromatic hydrocarbon may be used. More specifically, toluene may be used.

The amount of the solvent that is used may be 10 to 100 parts by weight, preferably 50 to 80 parts by weight, based on, for example, 100 parts by weight of the positive electrode active material.

In the present invention, mixing of compounds is not particularly restricted, and a well-known method may be used. For example, the compounds may be mixed with each other through mechanochemical reaction. In addition, a conventional stirrer, mixer, planetary ball mill, or mortar mixer may be used at the time of mixing. In the case in which the planetary ball mill is used, mixing may be performed at 50 to 500 rpm for 0.1 to 10 hours at 1 to 100 kWh/kg with respect to 1 kg of the positive electrode active material.

A solution in which a solid electrolyte and a binder are dispersed in advance (a solid electrolyte pre-dispersion solution) may be used as the solid electrolyte of step b).

A solvent used in a lithium secondary battery may be used as a solvent included in the solid electrolyte pre-dispersion solution. It is preferable that this solvent be easy to dry and be capable of well dissolving a binder but be capable of maintaining a solid electrolyte in a dispersed state without dissolving the solid electrolyte. In this case, it is important that the solvent not react with the solid electrolyte. Consequently, a nonpolar solvent capable of maintaining dispersion of a sulfide-based solid electrolyte may be used. This solvent may be identical to or different from the solvent used in the wet condition. It is preferable that a solvent identical to the solvent in the wet condition be used. Alternatively, the solid electrolyte may be melted so as to be used as the solvent without using a separate solvent.

It is preferable that the content of the solvent in the solid electrolyte pre-dispersion solution be 800 to 1000 parts by weight based on 100 parts by weight of the solid electrolyte. In the case in which the content of the solvent is less than 800 parts by weight based on 100 parts by weight of the solid electrolyte, solid content is difficult to properly disperse, which is undesirable. In the case in which the content of the solvent is greater than 1000 parts by weight based on 100 parts by weight of the solid electrolyte, the solvent is used in an excessive amount, which is uneconomical and is also undesirable. However, the content of the solvent may be changed depending on the kind of the solid electrolyte.

In order to increase dispersion force of the solid electrolyte, a dispersant may be further included in the solid electrolyte pre-dispersion solution, as needed. Any dispersant may be used as long as the dispersant is capable of being appropriately dispersed in the solvent. In the case in which a sulfide-based solid electrolyte is used, however, it is preferable that an inorganic dispersant be used, since an organic dispersant may deteriorate battery performance. The inorganic dispersant includes at least one selected from the group consisting of tertiary amine, ether, thiol, ester having a functional group having a carbon number of 3 or more bonded to a carbon atom of an ester bond and a functional group having a carbon number of 4 or more bonded to an oxygen atom of an ester bond, and ester having a benzene ring bonded to a carbon atom of an ester bond. In addition, a small molecular weight compound may be used as an example thereof. It is preferable that the carbon number of the ether compound be 10 or less. However, the present invention is not limited thereto.

The dispersant may be included so as to account for 10 to 20 parts by weight based on 100 parts by weight of the solid electrolyte. In the case in which the dispersant is added in a very small amount, dispersion force may be low. In the case in which the dispersant is added in a large amount, the dispersion force increasing effect is not significant, and properties of the battery may be affected. However, these may vary depending on the kind of the dispersant.

At the time of manufacturing the solid electrolyte pre-dispersion solution, a paste mixer, a shaker, a homogenizer, a paint shaker, an ultrasonic homogenizer, a bead mill, a roll mill, an apex mill, a vibration ball mill, or a dispersion apparatus using a combination thereof may be used. More preferably, the bead mill or the vibration ball mill is used. In the case in which the bead mill is used, zirconia beads may be used as a dispersion medium. In the case in which a rotary stirring type dispersion apparatus is used, it is preferable that stirring be performed in the state in which rpm is set to be high.

It is preferable that a material capable of electrically interconnecting the active material, the conductive agent, and the solid electrolyte while being well dissolved in the solvent of the solid electrolyte pre-dispersion solution be used as the binder used at the time of manufacturing the solid electrolyte pre-dispersion solution. The kind of the binder is not restricted. In the case in which a sulfide-based solid electrolyte is used, however, it is preferable that a binder capable of being melted in a nonpolar solvent while being inert with respect to the sulfide-based solid electrolyte be used. For example, the binder may be a compound selected from the group consisting of nitrile butadiene rubber, polyamide-imide (PAI), polyimide (PI), polyamide (PA), polyamic acid, polyethylene oxide (PEO), polystyrene (PS), poly(ethylene-co-propyleneco-5-methylene-2-norbornene) (PEP-MNB), polyvinylidene fluoride (PVDF), poly(vinylidene fluoride-co-hexafluoropropylene) (PVDF-HFP), polystyrene nitrile-butadiene rubber (PS-NBR), poly(methacrylate)nitrile-butadiene rubber (PMMA-NBR), and a mixture thereof.

It is preferable that the content of the binder be 25 to 250 parts by weight based on 100 parts by weight of the solid electrolyte. The reason for this is that performance of the battery is deteriorated in the case in which the content of the binder is too high and that the binder has difficulty exhibiting binding force in the case in which the content of the binder is too low.

An additive used at the time of manufacturing the electrode and a surfactant for increasing dispersibility and viscosity may be further added to the solid electrolyte pre-dispersion solution.

At the time of manufacturing the solid electrolyte pre-dispersion solution, the binder, the solid electrolyte, and the solvent may be mixed with each other. Alternatively, a solution having a solid electrolyte dispersed in a solvent may be mixed with the binder.

In addition, the conductive agent of step c) may include a solution in which a conductive agent and a binder are dispersed in advance (a conductive agent pre-dispersion solution).

A solvent used in a lithium secondary battery may be used as a solvent included in the conductive agent pre-dispersion solution. It is preferable that this solvent be easy to dry and be capable of well dissolving a binder but be capable of maintaining a conductive agent in a dispersed state without dissolving the conductive agent. Both an aqueous solvent and a non-aqueous solvent may be used. More preferably, however, a nonpolar solvent that does not react with a sulfide-based solid electrolyte is used. This solvent may be identical to or different from the solvent used in the wet condition. It is preferable that a solvent identical to the solvent in the wet condition be used.

It is preferable that the content of the solvent in the conductive agent pre-dispersion solution be 800 to 1000 parts by weight based on 100 parts by weight of the conductive agent. In the case in which the content of the solvent is less than 800 parts by weight based on 100 parts by weight of the conductive agent, solid content is difficult to properly disperse. In the case in which the content of the solvent is greater than 1000 parts by weight based on 100 parts by weight of the conductive agent, the solvent is used in an excessive amount, which is uneconomical. However, the content of the solvent may be changed depending on the kind of the conductive agent.

In order to increase dispersion force of the conductive agent, a dispersant may be further included in the conductive agent pre-dispersion solution, as needed. Any dispersant may be used as long as the dispersant is capable of being appropriately dispersed in the solvent. In the case in which a nonpolar solvent is used, however, a nonpolar or amphiphilic dispersant may be used. The dispersant may be included so as to account for 10 to 20 parts by weight based on 100 parts by weight of the conductive agent. In the case in which the dispersant is added in a very small amount, dispersion force may be low. In the case in which the dispersant is added in a large amount, the dispersion force increasing effect is not significant, and properties of the battery may be affected. However, these may vary depending on the kind of the dispersant.

At the time of manufacturing the conductive agent pre-dispersion solution, a paste mixer, a shaker, a homogenizer, a paint shaker, an ultrasonic homogenizer, a bead mill, a roll mill, an apex mill, a vibration ball mill, or a dispersion apparatus using a combination thereof may be used. More preferably, the bead mill or the vibration ball mill is used. In the case in which the bead mill is used, zirconia beads may be used as a dispersion medium. In the case in which a rotary stirring type dispersion apparatus is used, it is preferable that stirring be performed in the state in which rpm is set to be high.

It is preferable that a material capable of electrically interconnecting the active material, the conductive agent, and the solid electrolyte while being well dissolved in the solvent of the conductive agent pre-dispersion solution be used as the binder used at the time of manufacturing the conductive agent pre-dispersion solution. The kind of the binder is not restricted. In the case in which a nonpolar solvent is used at the time of manufacturing the conductive agent pre-dispersion solution, however, it is preferable that a binder capable of being melted in the nonpolar solvent be used. The binder capable of being melted in the nonpolar solvent may be at least one selected from the group consisting of Si, P, and N or a mixture thereof. A silicon-based polymer is preferably used. In addition, the binder may be a compound including a polar group and a nonpolar group.

It is preferable that the content of the binder be 25 to 250 parts by weight based on 100 parts by weight of the conductive agent. The reason for this is that performance of the battery is deteriorated in the case in which the content of the binder is too high and that the binder has difficult exhibiting binding force in the case in which the content of the binder is too low.

An additive used at the time of manufacturing the electrode and a surfactant for increasing dispersibility and viscosity may be further added to the conductive agent pre-dispersion solution.

At the time of manufacturing the conductive agent pre-dispersion solution, the binder, the conductive agent, and the solvent may be mixed with each other. Alternatively, a solution having a conductive agent dispersed in a solvent may be mixed with the binder.

Solid electrolyte particles of step a) and step b) may be identical to or different from each other. The solid electrolyte particles are different from each other in terms of at least one of the chemical ingredient, the particle size, and the particle size distribution thereof.

As for the particle sizes, the size of the solid electrolyte particles of step a) may be equal to or greater than the size of the solid electrolyte particles of step b). Some solid electrolyte particles of step a) may be distributed in the positive electrode active material, and the other portion in which the solid electrolyte particles of step a) are not distributed may be filled with the remaining solid electrolyte particles of step b). In addition, the opposite case is also possible. In the case in which a solid electrolyte particle having a larger size of step b) is distributed on a uniformly distributed solid electrolyte particle of step a), a space is formed between the solid electrolytes, and a conductive agent is introduced into the space, and therefore a triple point may be easily formed.

In addition, the solid electrolyte particles of step a) and step b) may be different from each other in terms of chemical properties. Since binding force between the solid electrolyte particles and the active material and binding force between the solid electrolyte particles and the conductive agent may be changed depending on the chemical properties, different kinds of solid electrolyte particles may be used to supplement the same. Alternatively, the same kind of solid electrolyte particles may be used in order to reduce chemical reaction while simplifying the steps. This may be differently applied depending on various conditions, such as the properties and capacity of each solid electrolyte particle.

The amount of the solid electrolyte mixed in step a) is less than the amount of the solid electrolyte with which the entirety of the outermost surface of the positive electrode active material is coated as a monolayer. This means a state in which, when the outermost surface of the positive electrode active material is coated with the solid electrolyte as a monolayer, the solid electrolyte does not surround the entirety of the outermost surface of the positive electrode active material. The amount of the solid electrolyte mixed in step a) may be 10 to 60 wt % of the total amount of the solid electrolyte used at the time of manufacturing the positive electrode mixture, and the amount of the solid electrolyte mixed in step b) may be 40 to 90 wt % of the total amount of the solid electrolyte used at the time of manufacturing the positive electrode mixture. The amount of the solid electrolyte may be changed depending on the size of the solid electrolyte and the size of the positive electrode active material.

The positive electrode active material may include any one selected from the group consisting of a layered-structure material, a spinel-structure material, and an olivine-structure material or a mixture thereof. For example, typical examples of the layered-structure material may include lithium cobalt oxide, lithium nickel cobalt manganese, and lithium nickel cobalt aluminum, and a typical example of the spinel-structure material may be lithium manganese composite oxide (LMO), and typical examples of the olivine-structure material may include lithium iron phosphate oxide (LFP) and $Fe_2(MoO_4)_3$. In addition, a porous carbon material, a sulfur-carbon composite positive electrode active material, lithium nickel oxide, or vanadium oxide may be used. Furthermore, any one of a compound having at least one element substituted with transition metal and a compound having at least one element substituted with alkaline earth metal ions or a mixture thereof may be included. In addition, well-known materials are included. Furthermore, one or more of the above materials may be mixed and used.

The average particle size of the positive electrode active material may be 1 nm to 30 μm, although average particle size of the positive electrode active material is not limited in the present invention.

The solid electrolyte according to the present invention may be a sulfide-based solid electrolyte. Although an oxide-based solid electrolyte may be used, it is preferable that the sulfide-based solid electrolyte, which has high lithium ion conductivity and uniform temperature stability, be used.

Sulfide-based particles are not particularly restricted in the present invention, and all well-known sulfide-based materials used in the field of lithium batteries may be employed. Commercial products may be purchased and used as the sulfide-based materials, or products manufactured by crystallizing amorphous sulfide-based materials may be used. For example, any one of a crystalline sulfide-based solid electrolyte and an amorphous sulfide-based solid electrolyte or a mixture thereof may be used as the sulfide-based solid electrolyte. Examples of a composite compound that can be used may include a sulfur-halogen compound, a sulfur-germanium compound, and a sulfur-silicon compound such as $Li_3PS_4$(LPS). Specifically, a sulfide, such as $SiS_2$, $GeS_2$, or $B_2S_3$, may be included, and $Li_3PO_4$, halogen, or a halogen compound may be added. Specifically, a sulfide-based electrolyte capable of exhibiting a lithium ion conductivity of $10^{-4}$ S/cm may be used.

The sulfide-based solid electrolyte may be used in the state in which the surfaces of particles thereof are coated and reformed, and the sulfide-based solid electrolyte is manufactured through a dry process or a wet process using a mixture including the particles. At the time of manufacturing the sulfide-based solid electrolyte, $Li_2O$, LiI, or $3LiBH_4$ may be further added. This stabilizes lithium, whereby it is possible to generate a passivation film on the surface of the solid electrolyte or to inhibit generation of hydrogen sulfide.

It is preferable that the size of the sulfide-based solid electrolyte particles be equal to or less than the size of the positive electrode active material in order to form a triple point of the positive electrode active material, the conductive agent, and the solid electrolyte, although the size of the sulfide-based solid electrolyte particles is not limited.

The conductive agent according to the present invention is not particularly restricted, as long as the conductive agent exhibits high conductivity without inducing any chemical change in a battery to which the conductive agent is applied. For example, any one of graphite, a carbon-based material, metallic powder, metallic fiber, needle-shaped or branch-shaped conductive whisker, a conductive metal oxide, and a conductive polymer, or a mixture thereof may be used as the conductive agent according to the present invention. More specifically, graphite, such as natural graphite or artificial graphite; a carbon material, such as carbon black, acetylene black, Ketjen black, channel black, furnace black, lamp black, thermal black, or carbon fiber; metallic powder, such as copper powder, nickel powder, aluminum powder, or silver powder; metallic fiber, such as copper fiber, nickel fiber, aluminum fiber, or silver fiber; needle-shaped or branch-shaped conductive whisker, such as zinc oxide whisker, calcium carbonate whisker, titanium dioxide whisker, silicon oxide whisker, silicon carbide whisker, aluminum borate whisker, magnesium borate whisker, potassium titanate whisker, silicon nitride whisker, or alumina whisker; a conductive metal oxide, such as titanium oxide; and a conductive polymer, such as a polyphenylene derivative, may be used as the conductive agent. These materials may be used alone or in the form of a mixture of two or more thereof.

The binder according to the present invention is not particularly restricted in the present invention, and a well-known binder may be used. For example, the binder that can be used in the present invention may be any one selected from the group consisting of N,N-bis[3-(triethoxysilyl)propyl]urea, polyethylene oxide (PEO), poly(vinylidene fluoride) (PVDF), and poly(vinylidene fluoride-co-hexafluoropropylene) (PVDF-co-HFP) or a mixture of two or more thereof, or may be any one selected from the group consisting of N,N-bis[3-(triethoxysilyl)propyl]urea, polyethylene oxide (PEO), poly(vinylidene fluoride) (PVDF), poly(vinylidene fluoride-co-hexafluoropropylene) (PVDF-co-HFP), conjugated diene-based rubber latex, such as acrylonitrile-based styrene butadiene rubber (SBR), acrylonitrile butadiene rubber (NBR), methyl methacrylate butadiene styrene (MBR), or butadiene rubber (BR), carboxymethyl cellulose (CMC), starch, hydroxypropyl cellulose, regenerated cellulose, polyvinyl pyrrolidone, tetrafluoroethylene, polyethylene, polypropylene, ethylene-propylene-diene terpolymer (EPDM), sulfonated EPDM, styrene butadiene rubber, fluoro rubber, and various copolymers or a mixture of two or more thereof.

The weight ratio of the entire positive electrode active material:the entire solid electrolyte:the entire conductive agent:the binder used in the positive electrode of the sulfide-based all-solid-state battery may be 50 to 80:10 to 30:1 to 10:1 to 10, specifically 65 to 75:15 to 25:1 to 5:1 to 5.

It is possible to manufacture a positive electrode mixture for all-solid-state batteries using the method of manufacturing the positive electrode mixture according to the present invention. It is possible to manufacture a positive electrode according to the present invention by coating and drying a positive electrode current collector with the manufactured positive electrode mixture.

The positive electrode current collector is not particularly restricted, as long as the positive electrode current collector exhibits high conductivity while the positive electrode current collector does not induce any chemical change in a battery to which the positive electrode current collector is applied. For example, the positive electrode current collector may be made of stainless steel, aluminum, nickel, titanium, or sintered carbon. Alternatively, the positive electrode current collector may be made of aluminum or stainless steel, the surface of which is treated with carbon, nickel, titanium, or silver.

Negative Electrode

A negative electrode current collector is not particularly restricted, as long as the negative electrode current collector exhibits high conductivity while the negative electrode current collector does not induce any chemical change in an all-solid-state battery. For example, the negative electrode current collector may be made of copper, stainless steel, aluminum, nickel, titanium, or sintered carbon. Alternatively, the negative electrode current collector may be made of copper or stainless steel, the surface of which is treated with carbon, nickel, titanium, or silver, or an aluminum-cadmium alloy. In addition, the negative electrode current collector may be configured in any of various forms, such as a film, a sheet, a foil, a net, a porous body, a foam body, and a non-woven fabric body, each of which has a micro-scale uneven pattern formed on the surface thereof in the same manner as in the positive electrode current collector.

In this case, the negative electrode current collector may be one selected from the group consisting of a lithium metal, a lithium alloy, a lithium metal composite oxide, a lithium-containing titanium composite oxide (LTO), and a combination thereof. Here, an alloy of lithium and at least one metal selected from among Na, K, Rb, Cs, Fr, Be, Mg, Ca, Sr, Ba, Ra, In, Al, and Sn may be used as the lithium alloy. In addition, the lithium metal composite oxide may be formed by lithium and an oxide ($MeO_x$) of any one metal (Me) selected from the group consisting of Si, Sn, Zn, Mg, Cd, Ce, Ni, and Fe. As an example, the lithium metal composite oxide may be $Li_xFe_2O_3$ ($0<x\leq1$) or $Li_xWO_2$ ($0<x\leq1$).

In addition, as the negative electrode active material, a metal composite oxide, such as $Sn_xMe_{1-x}Me'_yO_z$ (Me: Mn, Fe, Pb, Ge; Me': Al, B, P, Si, Group 1, 2, and 3 elements of the periodic table, halogen; $0<x\leq1$; $1\leq y\leq3$; $1\leq z\leq8$); or an oxide, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, or $Bi_2O_5$ may be used. Furthermore, a carbon-based negative electrode active material, such as crystalline carbon, amorphous carbon, or a carbon composite, may be used alone or in the form of a mixture of two or more.

In addition, natural graphite, mesocarbon micro beads (MCMB) artificial graphite, mesocarbon fiber (MCF) artificial graphite, meso phase-based low-temperature sintered carbon, and non-graphitizing carbon material or nanotube may be used alone in the form of a mixture of two or more as the negative electrode active material.

Manufacture of All-Solid-State Battery

Specifically, an all-solid-state battery according to the present invention includes the positive electrode and the negative electrode described above, and a sulfide-based solid electrolyte is disposed therebetween.

The electrode of the all-solid-state battery may have a structure in which an electrode active material is formed on an electrode current collector. However, the electrode current collector may be omitted depending on the structure thereof. In the case in which the electrode is a positive electrode, the electrode current collector is a positive electrode current collector. In the case in which the electrode is a negative electrode, the electrode current collector is a negative electrode current collector.

The all-solid-state battery is manufactured through a dry compression process in which an electrode and a solid electrolyte are manufactured in the form of powder and the electrode powder and the solid electrolyte powder are introduced and pressed in a predetermined mold. Manufacture of the all-solid-state battery except for the coated slurry composition formed according to the above-described method is not particularly restricted in the present invention, and a well-known method may be used.

A method of distributing an electrode slurry on a current collector and uniformly dispersing the electrode slurry using a doctor blade, a die casting method, a comma casting method, or a screen printing method may be used as a method of coating the current collector with the electrode slurry during the coating process according to the present invention. In addition, an electrode slurry may be formed on a separate substrate, and the electrode slurry and the current collector may be bonded to each other by pressing or lamination. At this time, the concentration or the number of coatings of a slurry solution may be controlled in order to adjust the final coating thickness.

The drying process is a process of removing a solvent and moisture in the slurry in order to dry the slurry coated on the metal current collector. The drying process may be changed depending on the solvent that is used. As an example, the drying process is performed in a vacuum oven at 50 to 200° C. For example, a drying method using warm air, hot air, or low-humidity air, a vacuum drying method, or a drying method using (far) infrared rays or electron beams may be used as a drying method. Drying time is not particularly restricted. In general, drying is performed for 30 seconds to 24 hours.

A cooling process may be further performed after the drying process. The cooling process is a process of performing slow cooling to room temperature such that the recrystallization structure of the binder is well formed.

In addition, if necessary, a rolling process of allowing the electrode to pass between two rolls heated to a high temperature such that the electrode is compressed to a desired thickness may be performed in order to increase capacity density of the electrode and to increase adhesion between the current collector and the active materials after the drying process. The rolling process is not particularly restricted in the present invention, and a well-known rolling process (pressing) is possible. As an example, the electrode may pass through rotary rolls, or may be a flat press machine may be used to perform the rolling process.

In addition, the present invention provides a battery pack including a battery cell as a unit cell and a device including the battery pack as a power source. Specifically, the battery pack may be used as a power source for a device requiring the ability to withstand high temperature, a long lifespan, high rate characteristics, etc. Preferred examples of the device may include a mobile electronic device, a wearable electronic device, a power tool driven by a battery-powered motor, an electric vehicle (EV), a hybrid electric vehicle (HEV), a plug-in hybrid electric vehicle (PHEV), and a power storage apparatus. However, the present invention is not limited thereto.

The structure and manufacturing method of the device are well known in the art to which the present invention pertains, and thus a detailed description thereof will be omitted from this specification.

Hereinafter, preferred manufacturing examples and examples will be described with reference to the accompanying drawings in order to aid in understanding of the present invention. These examples are given in order to illustrate the present invention, and do not limit the scope of the present invention.

FIG. 3 is a schematic view of a molecular structure in the case in which a positive electrode active material and a solid electrolyte are mixed with each other in bulk in a wet state, and FIG. 4 is a schematic view of a molecular structure of an electrode mixture obtained by mixing a positive electrode active material and a solid electrolyte with each other in bulk in a wet state and mixing the mixture with a conductive agent. In general, a positive electrode active material and a solid electrolyte have low miscibility with a solvent. In the case in which the positive electrode active material and the solid electrolyte are introduced and mixed with each other in bulk, therefore, constituents are nonuniformly dispersed, as shown in FIG. 3. Even in the case in which a conductive agent is subsequently mixed therewith, therefore, a positive electrode mixture is formed in the state in which the constituents are nonuniformly dispersed. This deteriorates efficiency and energy density of the battery.

A large central circle of FIG. 3 indicates an electrode active material 110, small circles around the electrode active material 110 indicate a solid electrolyte 120. In FIG. 4, the same materials and reference numerals as in FIG. 3 are used. Additional black dots indicate a conductive agent 130.

FIG. 5 is a schematic view of a molecular structure in the case in which a positive electrode active material 110 and solid electrolytes 120, 121, 122, and 123 are mixed with each other in part in a dry state in accordance with a manufacturing method of the present invention. Depending on properties of the positive electrode active material 110 and the solid electrolytes 120, 121, 122, and 123, the ratio and amount of both materials are adjusted, and the solid electrolytes 120, 121, 122, and 123 surround the positive electrode active material 110 as a single layer. At this time, the sizes of the solid electrolytes 120, 121, 122, and 123 may be different from each other, as shown in FIG. 5, or may be equal to each other. The sizes of the solid electrolytes 120, 121, 122, and 123 may be changed depending on properties and amounts of the positive electrode active material 110, the solid electrolytes 120, 121, 122, and 123, and a conductive agent 130. In order to achieve uniform dispersion, solid electrolytes 120, 121, 122, and 123 having different sizes may be used. In order to form a triple point among the positive electrode active material, the solid electrolytes, and the conductive agent, solid electrolytes 120, 121, 122, and 123 having the same size may be used.

FIG. 6 is a schematic view of a molecular structure in the case in which a positive electrode active material and a solid electrolyte are mixed with each other in part in a dry state and an additional solid electrolyte, formed as a pre-dispersion solution, is added thereto in a wet state in accordance with the manufacturing method of the present invention. The same reference numerals as in FIG. 5 are used. It can be seen that the solid electrolyte is uniformly distributed on the positive electrode active material, unlike FIG. 3. When mixing is performed in a dry state, the solid electrolyte is uniformly distributed irrespective of solubility in a liquid, as shown in FIG. 5, whereby contact between the positive electrode active material and the solid electrolyte is increased, and therefore resistance of the positive electrode active material and the solid electrolyte is reduced. In addition, a solid electrolyte having increased dispersion force as a pre-dispersion solution is added in a wet state to form a slurry, whereby it is possible to obtain a mixture in which the solid electrolyte is uniformly distributed on the positive electrode active material, as shown in FIG. 6. Also, in the case in which a positive electrode mixture slurry is manufactured and the current collector is coated with the slurry, the slurry and the materials in the slurry are uniformly distributed.

FIG. 7 is a schematic view of a molecular structure in the case in which a positive electrode active material and a solid electrolyte are mixed with each other in part in a dry state, an additional solid electrolyte, formed as a pre-dispersion solution, is added thereto in a wet state, and a conductive agent is mixed therewith in the form of a pre-dispersion solution in accordance with the manufacturing method of the present invention. Reference numerals of the materials are the same as in FIG. 5. It can be seen that the conductive agent is uniformly distributed in a positive electrode mixture of FIG. 7 and the conductive agent is distributed among solid electrolyte particles on the uniformly distributed positive electrode active material, whereby a triple point of the three materials is well formed, unlike FIG. 4.

This can be observed from FIGS. 8 to 11, which are scanning electron microscope (SEM) photographs of final positive electrode mixtures manufactured using methods according to Example 1 and Comparative Examples 1 and 2.

Example 1 and Comparative Examples 1 and 2 were performed in dry room conditions (23° C. and a dew point of −60° C.), and mixing was performed using a paste mixer for 3 to 18 minutes. In addition, the ratio (%) of materials used in each of Example and Comparative Examples was based on the total weight of each material used at the time of mixing. The weights of a positive electrode active material, the entirety of a solid electrolyte, a conductive agent, and a binder were 3 g, 1 g, 0.06 g, and 0.08 g in solid content, respectively. At this time, solid electrolytes having the same chemical ingredients were used.

First, in Example 1, a positive electrode mixture was formed through mixing using the following method.

1) Lithium cobalt manganese oxide (NCM) (100% of the entire active material used), as an active material, and an LPS-based electrolyte (X %), as a solid electrolyte, were mixed with each other in a dry state;

2) An additional solid electrolyte (100–X %) was dissolved in toluene (having capacity 8 to 10 times the capacity of the additional solid electrolyte), as a solvent, together with styrene butadiene rubber (SBR), as a binder, to prepare a pre-dispersion solution.

3) The material of step 1) and the pre-dispersion solution of step 2) were mixed with each other while the toluene, as a solvent, was added thereto.

4) Subsequently, an additional binder was added and mixed with the above mixture in a wet state.

5) A pre-dispersion solution obtained by dissolving vapor grown carbon fiber (VGCF), as a conductive agent, in toluene, as a solvent, together with SBR, as a binder, was mixed with the mixture of step 4) to form a final positive electrode mixture.

The diameter of the solid electrolyte used in step 1) was 0.6 μm, and the diameter of the solid electrolyte used in step 2) was 3 μm. In Example 1, solid electrolytes having different diameters were used. However, those skilled in the art will easily appreciate that solid electrolytes having same diameter may be used.

In Comparative Example 1, step 1), step 4), and step 5) were performed in the same manner as in Example 1 except that mixing was performed using a mixing method obtained by changing step 2) and step 3) of Example 1 as follows to form a positive electrode mixture.

The existing steps 2) and 3) were changed to "2) an additional solid electrolyte (100–X %) was mixed in a dry state."

In Comparative Example 2, step 2) and subsequent steps were performed in the same manner as in Example 1 except that mixing was performed using a mixing method obtained by changing step 1) as follows to form a positive electrode mixture.

The existing step 1) was changed to "1) a pre-dispersion solution obtained by dissolving a solid electrolyte (100–X %) was dissolved in toluene (having capacity 8 to 10 times the capacity of an additional solid electrolyte), as a solvent, together with styrene butadiene rubber (SBR), as a binder, was mixed with a positive electrode active material in a wet state."

The sizes of the positive electrode active material and the solid electrolyte are not limited as long as it is possible to satisfy the ratio at which less than 100% of the surface of the positive electrode active material was wrapped when X % of the solid electrolyte was added. In this experiment, however, lithium cobalt manganese oxide (NCM) having a size of 10 to 15 μm was used as an active material and an LPS-based electrolyte having a size less than the size of the active material was used as a solid electrolyte based on when X=30%. Also, in this experiment, a conductive agent having a size of 0.3 μm was used, although a smaller size of the conductive agent was preferable.

In this experiment, particle states were observed through scanning electron microscope (SEM) photographs.

FIG. 8 is a scanning electron microscope (SEM) photograph of a final positive electrode mixture obtained by mixing a positive electrode active material and a solid electrolyte with each other in a dry state, mixing the mixture with an additional solid electrolyte in a dry state, and mixing the mixture with a conductive agent in accordance with Comparative Example 1. It can be seen from the SEM photograph that the solid electrolyte was uniformly distributed around the positive electrode active material. The same is applied to FIG. 9, which is an SEM photograph of Example 1 of the present invention.

FIG. 10 is a scanning electron microscope (SEM) photograph of a final positive electrode mixture obtained by mixing a positive electrode active material and a solid electrolyte pre-dispersion solution with each other in a wet state, mixing the mixture with an additional solid electrolyte pre-dispersion solution in a wet state, and mixing the mixture with a conductive agent in a wet state, and FIG. 11 is a scanning electron microscope (SEM) photograph of molecules in the case in which a positive electrode active material and a solid electrolyte pre-dispersion solution are mixed with each other in a wet state.

It can be seen from FIG. 10 that, in the final positive electrode mixture obtained by mixing even the conductive agent, the solid electrolyte was not uniformly distributed on the positive electrode active material even though the solid electrolyte pre-dispersion solution was formed and coated, unlike FIG. 9. This is clearly visible in the SEM photograph of FIG. 11. As can be seen from the left photograph, the solid electrolyte was not uniformly distributed on the positive electrode active material. It can be well seen from the right photograph, which is an enlarged one of the left photograph, that the solid electrolyte was not uniformly distributed on the positive electrode active material.

Example 2, Comparative Example 3, and Comparative Example 4, in each of which a mono cell was manufactured, included the steps of Example 1, Comparative Example 1, and Comparative Example 2, respectively, and the following steps were further performed.

6) after step 5) of each of Example 1, Comparative Example 1, and Comparative Example 2, the positive electrode mixture obtained through mixing using the respective methods was applied to a metal current collector, and was then dried and rolled to obtain a positive electrode.

7) A mono cell was manufactured using the positive electrode.

Measurement of Initial Charge and Discharge Efficiency

The positive electrodes manufactured according to Example 2, Comparative Example 3, and Comparative Example 4 were charged to 4.25 V at a constant current of 0.05 C. Subsequently, the positive electrodes were charged to 0.01 C at constant voltage. Subsequently, the positive electrodes were left for 10 minutes, and were then discharged to 3V at a constant current of 0.01 C to measure one-cycle discharge capacity.

The results of measurement are shown in Table 1 below.

TABLE 1

|  | Charge Capacity (mAh/g) | Discharge Capacity (mAh/g) | Initial Efficiency (0.05C, 1$^{st}$Cycle) |
| --- | --- | --- | --- |
| Set 1 | 226.6 | 182.3 | 80.5 |
|  | 232.1 | 178.7 | 79.7 |
| Aver. | 229.4 | 180.5 | 80.1 |
| Set 2 | 225.7 | 171.8 | 76.1 |
|  | 228.1 | 174.2 | 76.4 |
| Aver. | 226.9 | 173 | 76.3 |
| Set 3 | 219.4 | 156.0 | 71.1 |
|  | 219.4 | 154.0 | 70.2 |
| Aver. | 219.4 | 155.0 | 70.7 |

In the above table, "Set 1" means charge capacities, discharge capacities, and initial charge and discharge efficiencies of the positive electrode according to Example 2, "Set 2" means charge capacities, discharge capacities, and initial charge and discharge efficiencies of the positive electrode according to Comparative Example 3, and "Set 3" means charge capacities, discharge capacities, and initial charge and discharge efficiencies of the positive electrode according to Comparative Example 4. In addition, "Aver." below each set means the average of the charge capacities, the discharge capacities, and the initial charge and discharge efficiencies of the positive electrode in each set. In each set, two batteries corresponding to each of Example and Comparative Examples were formed, and the charge capacities, the discharge capacities, and the initial charge and discharge efficiencies of the batteries were measured.

As can be seen from the above table, the charge capacity of the positive electrode according to Example 2 corresponding to the present invention was higher than the charge capacity of the positive electrode according to Comparative Example 4, in which only wet mixing was performed. It is estimated that this is based on the fact that the solid electrolyte was uniformly distributed on the positive electrode active material. In addition, it can be seen that the discharge capacity of the positive electrode according to Example 2 was higher than positive electrodes according to Comparative Examples. It is estimated that this is based on the fact that the positive electrode active material, the solid electrolyte, and the conductive agent were uniformly distributed on the positive electrode current collector.

Although the present invention has been described in detail, those skilled in the art will appreciate that the detailed description thereof discloses only preferred embodiments of the present invention and thus does not limit the scope of the present invention. Accordingly, those skilled in the art will appreciate that various changes and modifications are possible, without departing from the category and technical idea of the present invention, and it will be obvious that such changes and modifications fall within the scope of the appended claims.

DESCRIPTION OF REFERENCE NUMERALS 10, 110: Electrode active materials
20, 120, 121, 122, 123: Solid electrolytes
30, 130: Conductive agents
40: Triple point

INDUSTRIAL APPLICABILITY

The present invention relates to a method of manufacturing a positive electrode mixture for all-solid-state batteries. In the case in which the method of manufacturing the positive electrode mixture according to the present invention is used, contact among a conductive agent, an active material, and a solid electrolyte may be improved, and the conductive agent, the active material, and the solid electrolyte may be uniformly dispersed, whereby it is possible to increase capacity and efficiency of an all-solid-state battery. In addition, no separate process is added and no separate material is added, whereby the method of manufacturing the positive electrode mixture according to the present invention is efficient and economic.

The invention claimed is:

1. A method of manufacturing a positive electrode mixture for all-solid-state batteries, the method comprising:
    a) mixing a positive electrode active material and a solid electrolyte with each other in a dry state;
    b) adding an additional solid electrolyte to the mixture of step a) and performing mixing in a wet state; and
    c) adding a conductive agent to the mixture of step b) and performing mixing in a wet state,
    wherein the solid electrolyte mixed in step a) comprises a sulfide-based solid electrolyte.

2. The method according to claim 1, wherein the additional solid electrolyte of step b) is in a solid electrolyte pre-dispersion solution in which the additional solid electrolyte and a binder are dispersed in advance.

3. The method according to claim 1, wherein the conductive agent of step c) is in a conductive agent pre-dispersion solution in which the conductive agent and a binder are dispersed in advance.

4. The method according to claim 1, further comprising b1) adding a binder and performing mixing in a wet state, wherein step b1) is performed between step b) and step c).

5. The method according to claim 1, wherein particles of the solid electrolyte mixed in step a) and the additional solid electrolyte mixed in step b) are identical to each other.

6. The method according to claim 1, wherein particles of the solid electrolyte mixed in step a) and the additional solid electrolyte mixed in step b) are not identical to each other.

7. The method according to claim 6, wherein the particles of the solid electrolyte mixed in step a) and the additional solid electrolyte mixed in step b) are not identical to each other in terms of chemical ingredient, particle size, or particle size distribution.

8. The method according to claim 1, wherein the solid electrolyte mixed in step a) is in an amount less than the solid electrolyte with which an entirety of an outermost surface of the positive electrode active material is coated as a monolayer.

9. The method according to claim 8, wherein the solid electrolyte mixed in step a) is in an amount of 10 to 60 wt % of the total amount of the solid electrolyte used, and the additional solid electrolyte mixed in step b) is in an amount of 40 to 90 wt % of the total amount of the solid electrolyte used.

10. The method according to claim 1, wherein the positive electrode active material comprises any one of a layered-structure material, a spinel-structure material, an olivine-structure material or a mixture thereof.

11. The method according to claim 1, wherein the additional solid electrolyte comprises a sulfide-based solid electrolyte.

12. The method according to claim 1, wherein a weight ratio of an entire positive electrode active material:an entire solid electrolyte:an entire conductive agent:a binder used in the positive electrode mixture for all-solid-state batteries is 50 to 80:10 to 30:1 to 10:1 to 10.

13. A positive electrode mixture for all-solid-state batteries manufactured by the method according to claim 1.

14. A method of manufacturing a positive electrode for all-solid-state batteries, the method comprising:
    (S1) manufacturing the positive electrode mixture for all-solid-state batteries according to claim 1; and
    (S2) coating and drying a current collector with the positive electrode mixture of step (S1).

15. A positive electrode for all-solid-state batteries manufactured by the method according to claim 14.

16. The method according to claim 1, wherein the additional solid electrolyte is added in a solvent in an amount of 10 to 100 parts by weight based on 100 parts by weight of the positive electrode active material.

17. The method according to claim 2, wherein the solid electrolyte pre-dispersion solution comprises a solvent in an amount of 800 to 1000 parts by weight based on 100 parts by weight of the additional solid electrolyte.

18. The method according to claim 3, wherein the conductive agent pre-dispersion solution comprises a solvent in an amount of 800 to 1000 parts by weight based on 100 parts by weight of the conductive agent.

* * * * *